(No Model.) 2 Sheets—Sheet 1.

J. H. GARDNER.
PEA THRESHER.

No. 570,282. Patented Oct. 27, 1896.

Witnesses.

J. H. Gardner
Inventor (No Model.) 2 Sheets—Sheet 2.
J. H. GARDNER.
PEA THRESHER.
No. 570,282. Patented Oct. 27, 1896.
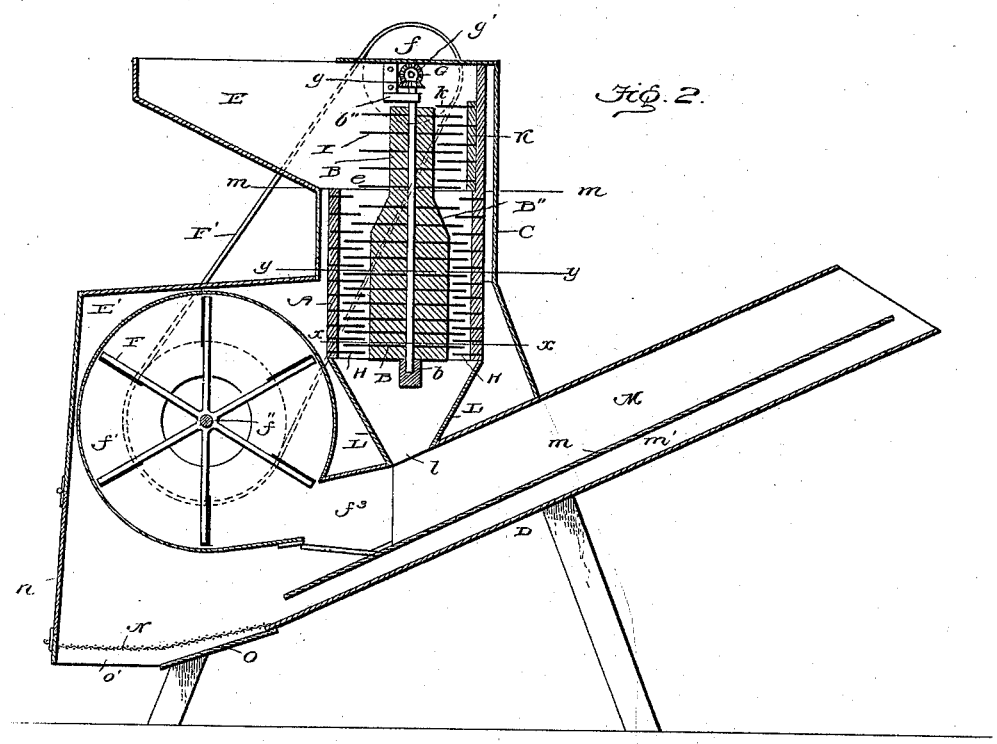
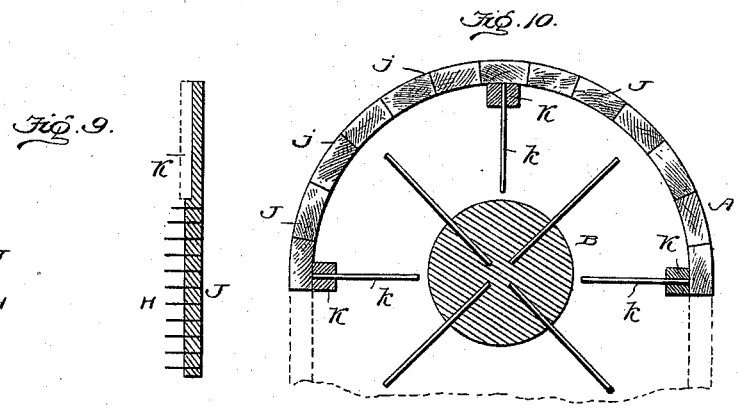
Witnesses: J. H. Gardner,
Inventor
By Edson Bros
Atty's

UNITED STATES PATENT OFFICE.

JOHN H. GARDNER, OF DALTON, GEORGIA.

PEA-THRESHER.

SPECIFICATION forming part of Letters Patent No. 570,282, dated October 27, 1896.

Application filed November 7, 1895. Serial No. 568,196. (No model.)

*To all whom it may concern:*

Be it known that I, JOHN H. GARDNER, a citizen of the United States, residing at Dalton, in the county of Whitfield and State of Georgia, have invented certain new and useful Improvements in Pea-Threshers; and I do hereby declare the following to be a full, clear, and exact description of the invention, such as will enable others skilled in the art to which it appertains to make and use the same.

My invention relates to pea-threshers, and the object that I have in view is to provide a simple and easily-operated machine, with as few working parts as practicable, which will operate to break the hulls, to release the peas therefrom without crushing or injuring the peas, and to separate the hulls from the peas, so that the peas may be discharged in a clean condition, free from pieces of hull and other refuse.

With these ends in view my invention consists in the novel combination of devices and in the construction and arrangement of parts which will be hereinafter fully described and claimed.

To enable others to understand my invention, I have illustrated the preferred embodiment thereof in the accompanying drawings, forming a part of this specification, and in which—

Figure 1:
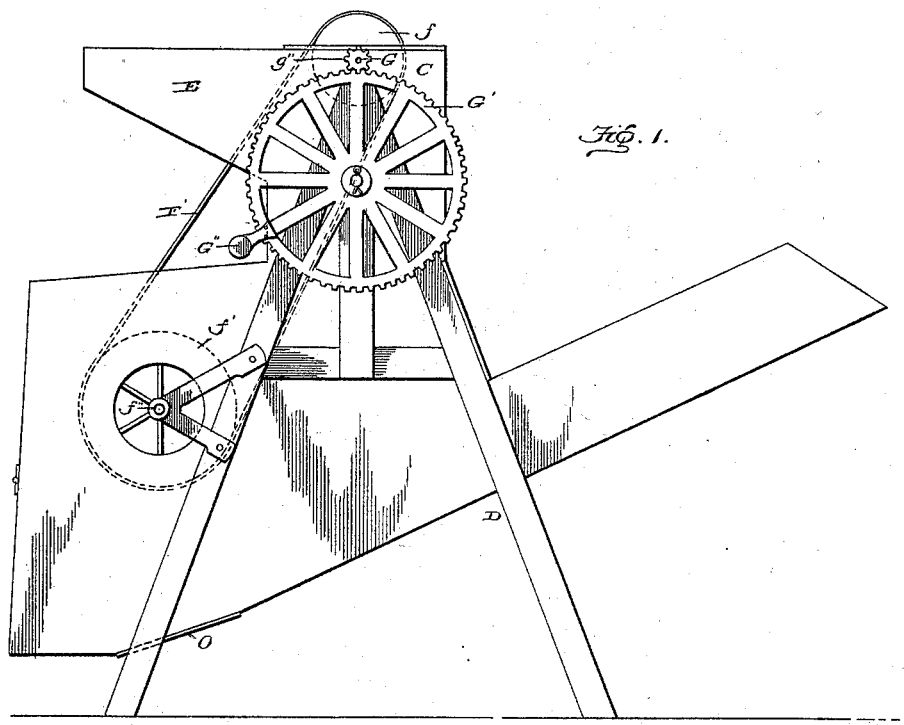
Figure 3:
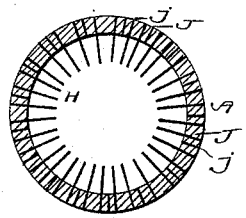
Figure 5:
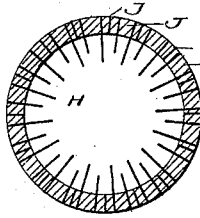
Figure 7:
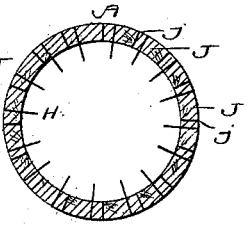
Figure 4:
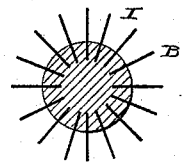
Figure 6:
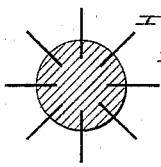
Figure 8:
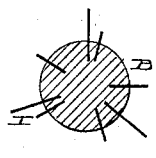

Figure 1 is a side elevation of my pea-thresher. Fig. 2 is a vertical sectional view through the same. Figs. 3 and 4 are horizontal sectional views through the concave and the cylinder, respectively, to show the relation of the teeth on the line $x\ x$ of Fig. 2. Figs. 5 and 6 are similar views through the concave and the cylinder, respectively, illustrating the teeth on the plane indicated by the dotted line $y\ y$ of Fig. 2; and Figs. 7 and 8 are like views of the concave and cylinder, showing the teeth on the plane indicated by the dotted line $m\ m$, Fig. 2. Fig. 9 illustrates in detail several of the staves which are to be assembled and form part of the concave. Fig. 10 illustrates the upper part of the concave, which is cut away opposite the hopper.

Like letters of reference denote corresponding parts in all the figures of the drawings, referring to which—

A designates the concave, and B is the cylinder, of my machine for threshing peas. Said cylinder and concave and the other parts of the thresher are inclosed within a suitable casing C, supported by the main frame D; and this casing C is constructed to provide the hopper E at its upper end and the inclosure E' for the fan F.

The cylinder B is arranged in a vertical position within the concave A, the axis of which is vertical, and said cylinder and concave are concentric with each other in order that the cylinder may rotate within the concave without having its teeth touch the teeth on the concave. The upper end of the cylinder is extended or carried across the throat $e$ of the hopper, through which throat the peas are fed to the cylinder and concave, whereby the teeth on the upper part of the cylinder are caused to carry some of the peas around with the cylinder to the rear side of the concave.

The cylinder is mounted on and carried by a vertical shaft $b$, the lower end of which is stepped in a foot-bearing $b'$, suitably supported below the concave A, and the upper end of this shaft is journaled in and extended through a fixed bearing $b''$. This protruding upper end of the vertical cylinder-shaft $b$ is geared to a horizontal driving-shaft G through the medium of the intermeshing bevel-gears $g\ g'$, and on the outer end of said shaft G is secured a spur gear-pinion $g''$, which meshes with the teeth of a master-gear G', the latter having a short shaft suitably journaled on the outside of the casing C, and said master-gear being provided with a crank-handle G'', by which the shafts G and $b$ may be conveniently driven by manual labor. The shaft G extends entirely across the machine through the opposite walls of the casing C, and to one end of the shaft is fastened the gear $g''$, as described, while to the other end of the shaft G is secured a band-pulley $f$, around which pulley is passed the endless belt F', that runs down to and around a band-pulley $f'$ on the protruding end of the fan-shaft $f''$, as indicated by the dotted lines in the drawings.

The teeth on the cylinder and the concave are peculiarly arranged with a view to crushing the pods or shells without breaking the peas, and these teeth preferably consist of straight cylindrical pins of steel or other appropriate material. The teeth on the concave are indicated at H as projecting inward on radial lines toward the cylinder, but free from contact therewith, and the teeth I on the cylinder project radially toward but not in contact with the concave, as shown. The teeth H I are arranged in rows around the cylinder and concave, with all the teeth forming one row in the same horizontal plane, and the rows of teeth H on the concave are arranged to alternate with the rows of teeth I on the cylinder, whereby the free ends of the teeth I extend beyond or overlap the teeth H of the concave, but without coming in contact therewith. The teeth H on the concave are of course stationary, but the teeth I are carried by the rotary cylinder B, and by arranging the two sets of teeth to alternate with each other the teeth I are adapted to sweep through the spaces between the rows of fixed teeth H on the concave.

The rows of teeth H I are spaced apart vertically the same distance substantially throughout the height or depth of the cylinder and the concave, but the rows of teeth increase radially from the top to the bottom of both the concave and the cylinder by providing a larger number of teeth in the bottom row than there are teeth in the rows about half-way up and still less teeth in the rows higher up than there are in the middle rows of teeth. This important feature of my invention is illustrated by Figs. 3 to 8, inclusive, which indicate the teeth on the planes $x\,x$, $y\,y$, and $m\,m$. It will be seen from an inspection of Figs. 3 and 4 that the number of teeth in the rows at the bottom part of the cylinder and the concave largely exceed in number the teeth in the rows of teeth on the plane indicated by the line $y\,y$ and shown by Figs. 5 and 6, and, further, that the number of teeth in the rows on the plane indicated at $m\,m$ and shown by Figs. 7 and 8 are much less than the number of teeth in the rows lower down, (indicated at $y\,y$ and shown in Figs. 5 and 6.) This disposition of the teeth on the cylinder and concave is an important feature of my invention, because I am able to thoroughly break up the pods or shells without injuring the peas and to separate or free the peas from the pods or shells prior to subjecting the mass to the action of an air-blast from a blower or fan to cleanse the peas from the broken pieces of shell or hull, thereby permitting the peas to be discharged from the machine separately from the hulls or other refuse.

In practice I make the cylinder B of irregular cross-sectional area by reducing the upper end of the cylinder at B' and forming the sloping portion B'' between the smaller upper end B' and the larger lower end B. The sloping part B'' of the cylinder lies opposite to or below the discharge-throat $e$ of the hopper to enable the peas from the hopper to lodge up against the sloping side of the cylinder, while the upper reduced end of the cylinder extends across the hopper-throat $e$ to enable the teeth I thereon to project into the mass of the peas which fills the hopper-throat, so that the upper teeth will carry the peas around with them to the rear side of the concave. These teeth I on the cylinder are practically of the same length throughout the depth of the cylinder, but by having the upper part of the cylinder of less diameter than the lower part the upper rows of teeth do not project as far toward the concave as the teeth on the lower larger part of the cylinder.

I prefer to construct my concave from a series of vertical staves or lags J, which are assembled together in cylindrical form to produce the concave, and these staves or lags are bound or united together rigidly to hold them in proper relation. These staves or lags abut against each other along their sides or edges, forming the joints $j$, (shown by Figs. 3, 5, and 7,) and from the inner faces of these lags or staves J project the teeth H. At the lower part of each stave J, I provide two pins H H, which are of equal length. (See Fig. 3.) About half-way up each stave I provide two pins which are of unequal length, (see Fig. 5,) while the upper part of each stave has a single tooth or pin, (see Fig. 5,) whereby the rows of teeth are increased radially from the bottom upward, as has been described. The front side or half of the concave A terminates below the throat $e$ of the hopper. Hence the lags which form the front of the concave extend about half-way up the cylinder-shaft $b$, but the rear side of the concave extends all the way up the cylinder, so that the lags or staves at the back side of the concave are equal in length to the cylinder-shaft.

It will be noted that the lags or staves at the back side of the concave are cut away at the upper portions thereof (see Fig. 9) to provide the prolongation or extensions which lie opposite to the reduced upper end B' of the cylinder, and that a considerable space is left between these reduced prolonged ends of the rear concave-staves and the reduced upper end of the cylinder. To utilize this space, I provide the breaker bars or strips K, preferably three in number, which are arranged vertically inside of the concave at the rear part thereof, and which bars or strips K are spaced apart a few inches from each other. These bars K are fastened in place in any suitable way, and from these bars project the pin-like teeth $k$, which alternate with the teeth I on the cylinder. These toothed bars or strips K greatly increase the capacity of the machine.

The teeth H on the concave are not all of the same length, and the teeth H opposite the sloping part B'' and the reduced upper end B' of the cylinder are shorter and fewer in number than the teeth at the bottom part of the concave in order that the entire pods or the large pieces of hulls may pass between the cylinder and concave to be subjected to the action of the teeth H I without choking up the throat of the hopper, and as the pods are broken up by the teeth and pass downward between the cylinder and concave they are subjected to the action of the closely-grouped teeth, so that the peas will be fully separated and freed from the pods or hulls by the time the mass has passed the cylinder and concave.

The mass drops upon the converging boards L L, fixed below the cylinder and concave and which are arranged to form the contracted discharge-throat $l$. At one side of these converging boards is arranged the fan F, which is inclosed in the fan-casing F', provided with the contracted mouth $f^3$, that is arranged to direct the blast from the fan below the throat $l$.

The blast is so regulated that the broken hulls will be carried up the inclined chute M and discharged from the open upper end thereof, while the peas fall by gravity upon the inclined false bottom $m$, which is arranged within the chute M. The false bottom $m$ is arranged within the chute to leave the passage-way $m'$ between the false bottom and the closed bottom side of said chute, and the upper end of said false bottom $m$ terminates within the chute M in order that any peas which may be carried through the chute along with the air-blast may drop over the upper end of the false bottom and into the passage-way $m'$ back to the screen N. The other lower end of the false bottom $m$ extends below the mouth $f^3$ of the fan-casing to leave room for the peas, which fall on the bottom $m$ from the throat $l$ to pass directly to the screen N. This screen extends from the bottom or wall of the casing C up to the front wall of said casing, and below this screen is an inclined discharge-board O, which forms an opening $o'$, through which the peas may be discharged into a suitable receptacle. The screen N is preferably made of wire-netting having meshes sufficiently large for the peas to drop or pass through the same, but the screen is adapted to catch and retain any particles or pieces of hull or other refuse which may pass down the false bottom $m$ with the peas. Any accumulation of hulls, refuse, &c., on the screen N can easily be removed by hand through the door $n$, provided in the front wall of the casing C.

It is thought that the operation and advantages of my improved pea-thresher will be readily understood and appreciated from the foregoing description taken in connection with the drawings.

I am aware that changes in the form and proportion of parts and in the details of construction herein shown and described as the preferred embodiment of my invention can be made by a skilled mechanic without departing from the spirit or sacrificing the advantages of my invention.

Having thus fully described my invention, what I claim as new, and desire to secure by Letters Patent, is—

1. In a pea-thresher, the combination with a hopper, and a concave, of the cylinder having a reduced upper part which extends across the throat of the hopper, two series of teeth on the opposing faces of the cylinder and the concave, and the toothed bars K fixed in the upper part of the concave on the side thereof opposite to the throat of the hopper.

2. In a pea-thresher, a vertical concave, one side of which is cut away, with the opposite side extending above said cut-away portion, and teeth secured within the concave, combined with a toothed vertical cylinder extending through said concave and above the cut-away portion thereof, and toothed bars secured within the upwardly-projecting side of said concave, as and for the purposes described.

3. In a pea-thresher, the combination with a casing having a hopper, as E, of a vertical concave, one section or portion of which terminates on a plane below the throat of said hopper and the remaining portion of which concave projects upwardly into the casing opposite said hopper, toothed bars in the upper projecting portion of the concave, teeth secured in the concave and increasing in length and number from a plane below the toothed bars to the bottom of said concave, and a vertical cylinder having teeth which increase in number toward the bottom of the cylinder, substantially as and for the purposes described.

4. In a pea-thresher, the combination with a casing having a hopper, as E, of a vertical concave, one section or portion of which terminates below the plane of the throat of said hopper, and the remaining side of which concave protrudes upwardly into the casing opposite to the hopper thereof, an upright cylinder having the reduced upper end which extends across the throat of the hopper and opposite to the upwardly-extending portion or side of said concave, and annular rows of teeth on said cylinder and concave, the teeth on the concave being increased in length and number beginning at the line of the hopper-throat and extending substantially to the lower end of said concave, and the teeth on the cylinder also increased in number from the upper, substantially, to the lower portion of said cylinder, as and for the purposes described.

5. In a pea-thresher, the combination with a casing having a hopper as E, of the vertical concave within said casing, toothed bars arranged opposite to said hopper, the annular rows of teeth on the concave which rows of teeth are grouped closely together as they approach the lower end of the concave and increase in number and length from a line below the toothed bars toward the bottom of the concave, a cylinder extending through said concave and having a reduced portion opposite to the hopper, and annular rows of teeth arranged on said cylinder so as to lie closer together, and increase in number radially, as they approach the lower end of the cylinder, as and for the purpose specified.

In testimony whereof I affix my signature in presence of two witnesses.

JOHN H. GARDNER.

Witnesses:
W. S. WHITE,
F. T. HARDWICK.